(12) United States Patent
Wang

(10) Patent No.: US 12,504,068 B2
(45) Date of Patent: Dec. 23, 2025

(54) ADJUSTMENT APPARATUS FOR A STEERING GEAR MECHANISM IN A MOTOR VEHICLE AND MOTOR VEHICLE STEERING GEAR MECHANISM

(71) Applicant: ZF Active Safety and Electronics US LLC, Livonia, MI (US)

(72) Inventor: James Wang, Bloomfield Hills, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 0 days.

(21) Appl. No.: 18/474,310

(22) Filed: Sep. 26, 2023

(65) Prior Publication Data

US 2025/0102060 A1    Mar. 27, 2025

(51) Int. Cl.
*F16H 57/12* (2006.01)
*F16H 1/20* (2006.01)

(52) U.S. Cl.
CPC ............. *F16H 57/12* (2013.01); *F16H 1/20* (2013.01); *F16H 2057/125* (2013.01)

(58) Field of Classification Search
CPC ..... F16H 57/12; F16H 55/18; F16H 2057/125
See application file for complete search history.

(56) References Cited

U.S. PATENT DOCUMENTS

| | | |
|---|---|---|
| 4,147,071 A | 4/1979 | Scribner et al. |
| 2007/0216125 A1 | 9/2007 | Baxter |
| 2008/0006471 A1 | 1/2008 | Nakamura et al. |
| 2013/0047801 A1 * | 2/2013 | Ostein ............... F16H 57/12 81/484 |
| 2019/0136955 A1 | 5/2019 | Tuerk et al. |

FOREIGN PATENT DOCUMENTS

| | | | | |
|---|---|---|---|---|
| CN | 107010105 A | * | 8/2017 | ............... B60K 1/02 |
| CN | 107202157 A | | 9/2017 | |
| JP | H0286878 U | * | 7/1990 | |
| JP | 2008254494 A | * | 10/2008 | |
| JP | 2009214682 A | * | 9/2009 | |
| JP | 2010025307 A | * | 2/2010 | |
| WO | WO-0232741 A1 | * | 4/2002 | ........... B62D 5/0409 |
| WO | 2008/101771 A1 | | 8/2008 | |

OTHER PUBLICATIONS

Human-Assisted machine translation of JP2010-25307A.*
Email from USPTO Scientific & Technical Informaiton Center (STIC) Translation Branch.*

* cited by examiner

*Primary Examiner* — Bobby Rushing, Jr.
(74) *Attorney, Agent, or Firm* — Tarolli, Sundheim, Covell & Tummino LLP

(57) ABSTRACT

The invention relates to an adjustment apparatus 20 for a steering gear mechanism 1, in particular for motor vehicles, wherein in a gear train having at least three gears an intermediate gear 27 is arranged in such a manner that it can move along a straight adjustment line 105 in order to adjust backlash in the gear train. The intermediate gear 27 can be displaced along the straight adjustment line 105 in such a manner that the backlash in the entire gear train adjusts itself. The invention further relates to a motor vehicle steering gear mechanism 1 comprising the adjustment apparatus 20.

15 Claims, 2 Drawing Sheets

Figure 1:
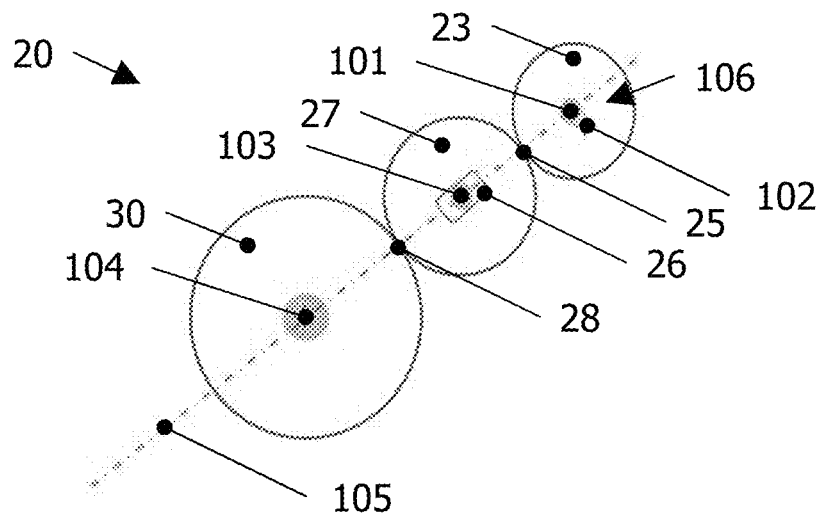

ADJUSTMENT APPARATUS FOR A STEERING GEAR MECHANISM IN A MOTOR VEHICLE AND MOTOR VEHICLE STEERING GEAR MECHANISM

The invention relates to an adjustment apparatus for a steering gear mechanism, in particular for motor vehicles, wherein in a gear train having at least three gears an intermediate gear is arranged in such a manner that it can move along a straight adjustment line in order to adjust a backlash in the gear train. Furthermore, the invention relates to a motor vehicle steering gear mechanism comprising the adjustment apparatus.

Steering gear mechanisms are generally used in motor vehicles for steering wheels. These steering gear mechanisms connect a steering handle, such as a steering wheel, to a toothed rack which acts on the wheels via a track rod end and thereby moves them. In order to increase the steering force, vehicles have actuators which amplify the manual forces of the driver and thereby enable a physically easier control of the vehicle.

For steering force support, various energy sources have been found to be practical, in particular hydraulic, electric and electromechanical systems are currently widespread. The electrification of the drive train of motor vehicles has also led to electromechanical actuators being increasingly used for steering force support.

The steering force support can be installed in the steering gear mechanism at different locations. Common systems already support the steering forces of the driver in the steering column (Column Drive). Alternatively, the steering force support can also be introduced at the toothed rack (Rack Drive). In rack drive systems, it is conventional for the steering force support to be installed at a different location from the connection location to the steering column. The required structural space is thereby distributed along the toothed rack, whereby the entire arrangement can be better integrated in the vehicle.

Systems for supporting the steering force can also be in the form of a steer-by-wire (SbW) System in which there is no mechanical connection between the steering wheel and the steered vehicle wheels. The torque required to steer the vehicle wheels is in this instance provided by an actuator which adjusts the torque in accordance with the steering wheel angle. In particular, the adjustment apparatus according to the invention is constructed to be used in an actuator for an SbW System.

In rack drive systems, an electric motor produces a torque which is transmitted via one or more gears to a spindle nut. The spindle nut in turn transmits the torque to a spindle in which the rotation is converted into a translation movement. In this context, a rotation/translation gear mechanism is often referred to.

As a result of the high motor speed of the actuator of the steering force support, however, it is necessary to step it down since the required speed for the rotation/translation step-down gear mechanism is very low. A single-step reduction has not been found to be practicable, for which reason stepped-down gear mechanisms are increasingly repeatedly used.

Spur gear tooth arrangements have established themselves as step-down gear mechanisms, wherein they have a large structural spatial requirement. Step-down gear mechanisms which step down the speed from the actuator to the spindle nut using a belt are also known. As a result of the large spacing between the actuator and spindle nut, it is often further necessary to use an intermediate gear in the step-down gear mechanism in order to keep the required structural space small.

As a result of production and assembly tolerances, the backlash in spur gear tooth arrangements may vary, which may have an unfavorable effect on the operational reliability. An adjustment of the backlash in large-scale production is linked with high costs and is further highly time-consuming.

In order to adjust the backlash, various systems are currently commonplace, wherein, however, always only a backlash of the gear train can be adjusted and the adjustment procedure is therefore time-intensive. CN107202157A discloses an apparatus in which the backlash between the output gear of the gear mechanism and the intermediate gear is adjusted by means of a rotation/translation adjuster, such as a cam. Subsequently, the backlash between the intermediate gear and drive gear is adjusted by means of elongate holes by means of which the actuator can be moved relative to the intermediate gear.

The adjustment of the backlash between the intermediate gear and the drive gear comprises an additional assembly step which is linked with additional costs.

An object of the present invention is therefore to overcome the disadvantages of the prior art, in particular to provide an adjustment apparatus for steering gear mechanisms in which the adjustment of the backlash of a gear train is simplified.

This object is achieved with an adjustment apparatus according to the invention for a steering gear mechanism in a motor vehicle, wherein between a drive gear and an intermediate gear there is a first portion of a gear train and between the intermediate gear and an output gear there is a second portion of the gear train, wherein the intermediate gear in order to adjust a backlash is movably arranged along a straight adjustment line, wherein a backlash of at least one portion of the gear train can be adjusted.

As a result of the movable arrangement of the intermediate gear along the straight adjustment line, it is possible to carry out the backlash in the entire gear train only by adjusting the intermediate gear. Not only are costs in the production thereby saved but also a subsequent adjustment is enabled, as occurs, for example, after a maintenance operation. The backlash can also thereby be readjusted independently by the steering gear mechanism should the geometric dimensions of the wheel gear change during operation as a result of wear. It is also possible as a result of the adjustment apparatus according to the invention for the backlash to be adjusted independently in the case of irregular heating or cooling, as may occur in very hot or cold regions, for instance. All these measures contribute to the service-life of the steering gear mechanism being increased and the correct function being maintained over a longer service-life.

There is provision for the intermediate gear to be arranged so as to be able to be moved in translation along the straight adjustment line, that is to say, for the rotation axis of the gear not to be fixed with respect to a steering gear mechanism housing. The rotation axis of the intermediate gear is the axis about which the gear rotates with meshing gears. There may also be provision for the drive gear not to be displaced via a cam or an elongate hole, but instead the output gear which is located on the spindle nut.

An adjustment of the backlash of the gear train could be carried out as follows. Firstly, via a cam or an elongate hole the motor flange is displaced with the drive pinion relative to the housing of the steering gear mechanism. The backlash between the drive gear and the intermediate gear is thereby adjusted. However, since the intermediate gear is arranged so as to be able to be displaced along the straight adjustment line, as a result of the pushing of the drive gear toward the intermediate gear, the intermediate gear is displaced in the direction of the output gear. As a result of this displacement, the backlash between the intermediate gear and output gear is also adjusted at the same time.

Using a feeler gauge, during the assembly the backlash can be verified on at least one of the portions of the wheel gear. The backlash on the other portion of the gear train is accordingly automatically adjusted. If the desired backlash is adjusted, the motor flange is fixed to the housing.

According to a first embodiment, there is provision for the straight adjustment line to extend through the rotation axes of the drive gear and output gear. If either the drive gear or the output gear has a cam fixing, the straight adjustment line can lead through at least one of the rotation axes of the cam.

According to a preferred embodiment, the drive gear, the output gear and the intermediate gear are supported with respect to each other in such a manner that an adjustment of the backlash on one of the portions of the gear train brings about a simultaneous adjustment of the backlash on one of the other portions of the gear train. As already described above in detail, as a result of the adjustment of the backlash on one of the portions of the gear train, the backlash on the other portion of the gear train can also be carried out by displacing the intermediate gear along the straight adjustment line. If, for example, the backlash is undersized on one of the portions of the gear train, the intermediate gear is displaced to the other portion of the gear train. As a result of the displacement of the intermediate gear, the backlash is automatically adjusted. The meshing gears produce a force on the intermediate gear which acts along the straight adjustment line. This force moves the intermediate gear to the other portion of the gear train, whereby a force equilibrium is produced inside the gear train and the intermediate gear is thereby arranged on the straight adjustment line.

According to one embodiment, there is provision for one of the drive gear and the output gear to be supported so as to be able to be displaced in rotation and translation. For example, the drive or output gear can be adjusted by means of a cam. However, it is also possible for the drive or output gear to be displaced along another straight line, for instance, through an elongate recess, such as an elongate hole.

Another advantageous embodiment makes provision for the respective other of the output gear and the drive gear to be supported in a fixed manner. There is provision for only the drive gear or the output gear to be displaceably arranged and for the other of the output gear or drive gears to be securely supported. This is sufficient in that a displacement of the intermediate gear and another gear is sufficient to adjust the backlash between both portions of the gear train. As a result of the construction of the steering gear mechanism, it is advantageous that in particular the drive gear is displaceably arranged and the output gear has a fixed bearing. A fixed bearing is intended to be understood to mean that the axis of the gear cannot move relative to the steering gear mechanism housing. The other gear in contrast can be arranged as a so-called floating bearing, which enables the gear to move along at least one extent direction.

According to another aspect of the invention, the steering gear mechanism has a support device having at least one drive unit and a drive control. A support device may in particular be in the form of an electric motor, wherein the electric motor may have a single or dual winding. Furthermore, there may be provision for the support device to drive the drive gear hydraulically or pneumatically. In any case, the support device must be constructed in such a manner that it can rotationally drive a drive gear.

The drive control is constructed in such a manner that a control of the drive unit of the support device is enabled. To this end, the drive control may comprise, in particular, hydraulic or pneumatic valves, electrical actuation elements or electric power electronic units which enable a control of the drive unit. The drive control may obtain the signals required for control from a sensor, such as a steering angle sensor on the handle. In particular, there may be provision for the sensor to predetermine on the handle a desired steering angle, toward which the drive control controls the drive unit so that a steering angle on the steered wheels of the motor vehicle is achieved.

According to another embodiment, there is provision for the drive unit to be supported so as to be able to be displaced in rotation and translation. In conventional drive units, such as an electric motor, the drive gear is displaced together with the drive unit if it is displaced. It is therefore sufficient to displace the drive unit relative to a steering gear mechanism housing so that the drive gear is also displaced. However, it is also possible to configure only the drive gear so as to be able to be displaced in rotation and translation without moving the drive unit.

Another aspect of the invention makes provision for the intermediate gear to be supported in a recess which extends along the straight adjustment line. The recess may in particular be in the form of an elongate hole. However, any other form of a recess which enables the intermediate gear to be displaced along the straight adjustment line is possible.

According to another embodiment, an adjustment direction is provided from the backlash between the teeth of a steering gear mechanism to support steering force in a motor vehicle, comprising a carrier, a drive gear which is connected to a drive, an output gear which drives a rotation/translation gear mechanism and a rotation axis of the drive gear with respect to the carrier is arranged in a fixed manner with respect to a steering gear mechanism housing and an intermediate gear which connects the drive gear to the output gear, wherein the intermediate gear is arranged so as to be able to be displaced in translation along a straight adjustment line.

The carrier of a steering gear mechanism is constructed in such a manner that it receives at least a portion of the support of the drive gear, intermediate gear or output gear. To this end, the carrier may have recesses in which there are pressed roller bearings in which the rotation axes of the gears extend. In addition the carrier may have a cavity in which the intermediate gear can be displaced along the straight adjustment line. The carrier also represents a connection between the drive unit, such as an electric motor, and the steering gear mechanism. In particular, to this end, a translational and rotational adjustment unit, such as a cam, may be provided. However, it is also possible for there to be inserted between the drive unit and carrier another element which carries out the rotational and translational movement of the drive unit. Furthermore, there is provision for the carrier together with other components to constitute the housing of the steering gear mechanism.

Figure 2:
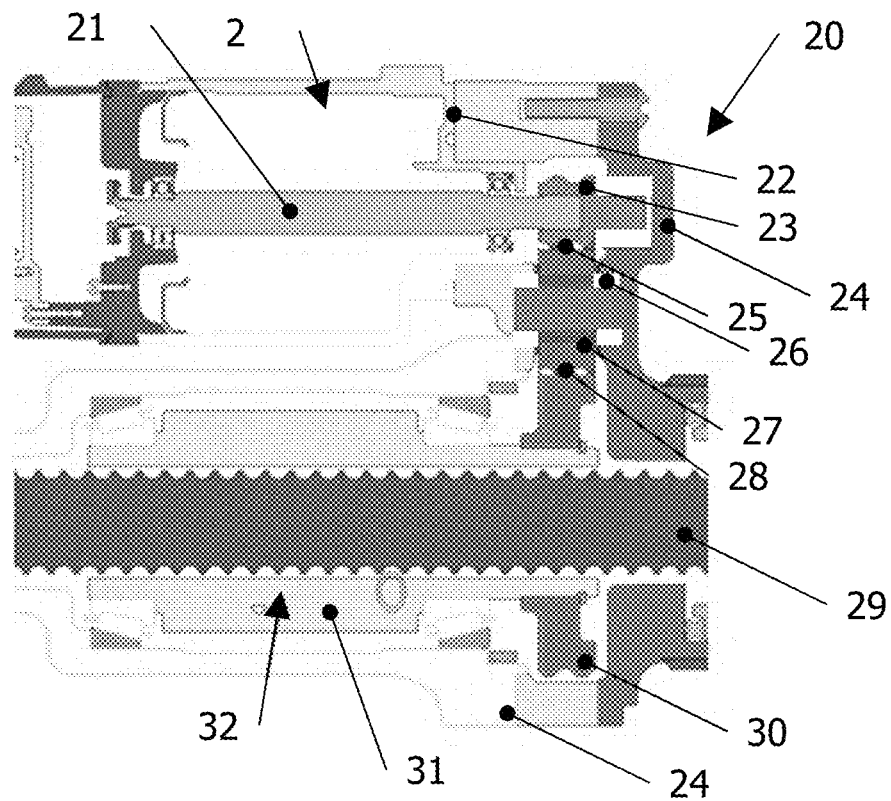
Figure 3:
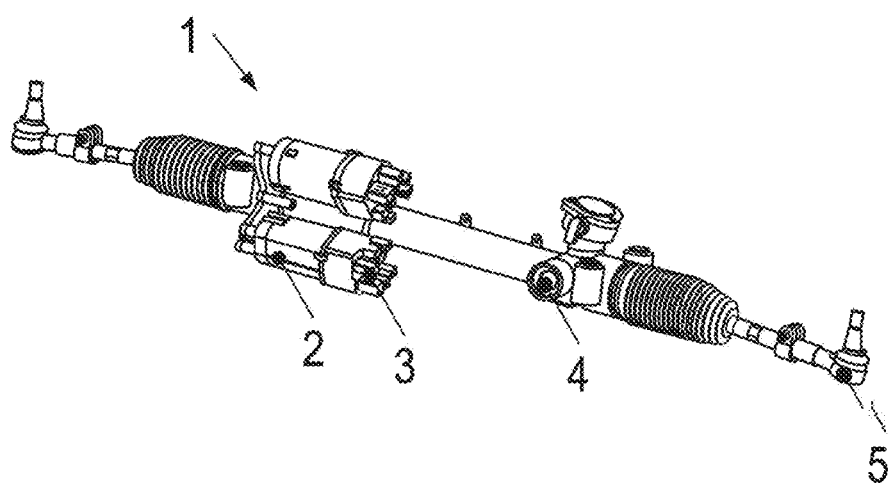

Other features, advantages and properties of the invention will be explained with reference to the description of preferred embodiments of the invention and the Figures, in which:

FIG. 1: shows a schematic drawing of the adjustment apparatus;

FIG. 2: shows a sectioned view of a steering gear mechanism having an adjustment apparatus according to the invention with a section through the drive gear, intermediate gear and output gear; and FIG. 3: shows an example of a steering gear mechanism according to the invention with two drive units and an adjustment apparatus according to the invention.

FIG. 1 shows a schematic drawing of the adjustment apparatus 20. In this instance, a drive gear 23 meshes with an intermediate gear 27 which in turn meshes with an output gear 30. Both the rotation axis of the drive gear 101, the rotation axis of the intermediate gear 103 and the rotation axis of the output gear 104 are arranged along a straight adjustment line 105. The rotation axis of the intermediate gear 103 is supported in both opposing recesses 26 which extend along the straight adjustment line 105.

Either the drive gear or the output gear comprises a cam 106 so that the rotation axis of the adjusted gear can be displaced. In the schematic drawing shown, the drive gear 23 can be adjusted by means of a cam 106. As a result of the rotational and translational movement by the cam 106, the rotation axis of the drive gear 101 is displaced on a circular path 102. In this instance, the straight adjustment line 105 may extend through any location of the rotation axis of the cam 102.

FIG. 2 shows a sectioned view of an adjustment apparatus 20 according to the invention with a section through the drive gear, intermediate gear and output gear. In order to produce a supporting force, the steering gear mechanism 1 has a drive unit 2 which transmits the rotational force to a rotor shaft 21. The rotor shaft 21 is in turn connected to the drive gear 23 in a rotationally secure manner.

The motor torque which is transmitted to the drive gear 23 is transmitted via a first portion of the gear train 25 to an intermediate gear 27. The intermediate gear 27 may move along a recess 26. There is provision for the recess 26 as illustrated in FIG. 2 to be located along a notional line, in this instance a section plane between the drive gear, intermediate gear and output gear. The intermediate gear 27 is in turn connected to an output gear 30 by means of a second portion of the gear train 28. The adjustment apparatus 20 surrounds a steering gear mechanism housing which comprises a carrier 24. Preferably, the drive unit 2 is secured to a housing portion arranged opposite the carrier 24.

The output gear transmits the torque of the intermediate gear 27 to the spindle nut 31 of the rotation/translation gear mechanism 32. The torque applied by the drive unit 2 is transmitted by means of the gear train to the spindle nut 31, in which a spindle 29 which produces a translational movement for the track rod end 5 runs. The rotation/translation gear mechanism 32 may in particular be in the form of a ball screw drive, wherein in FIG. 2 the roller members of the gear mechanism are not shown.

As can be seen in FIG. 2, the intermediate gear 27 may be freely displaced along the recess 26. If, for example, the backlash between the drive gear 23 and intermediate gear 27 were to become too small, that is to say, produce an undersized backlash, the intermediate gear 27 would move along the recess 26 in the direction of the output gear 30, as already described above. The movement direction of the intermediate gear 27 would accordingly be reversed if a backlash between the intermediate gear 27 and output gear 30 were to become too small.

There is further provision for the recess 26 to be formed in particular in the carrier 24, wherein a recess 26 may also be present only in a portion of the carrier. As can be seen in FIG. 2, the carrier 24 partially receives the bearing of the rotation axles of the gear train. Between the drive unit 2 with the motor flange 22 a connection to the carrier 24 is also produced. The connection between the motor flange 22 and carrier 24 can be carried out by means of a screw connection, as illustrated. In particular, there is provision for the motor flange 22 to be connected to the carrier 24 by means of a cam 106.

FIG. 3 shows a steering gear mechanism 1 which has two drive units 2 having an associated drive control 3. In a variant which is not illustrated, however, there may be provision for only one drive unit 2 which is controlled by the drive controls to be provided. Both drive units 2 act via a gear train on a spindle within the steering gear mechanism 1 (both not illustrated) and thereby produce a force on the track rod end 5. The track rod end 5 is secured to a wheel suspension of the steered wheels and produces a steering force thereon.

The steering instruction is carried out by means of a connection of the steering handle from the drive to the steering gear mechanism 1 via a steering column connection 4 on the steering gear mechanism 1 or by means of a by-wire system in which the drive control 3 is incorporated. In the first case, the steering column transmits the force applied by the driver to the steering gear mechanism 1, which is detected by a control and the drive control 3 is controlled accordingly. There may also be provision for one or more drive units 2 to be provided for the steering gear mechanism 1. In particular with heavy motor vehicles or utility vehicles, a plurality of drive units and where applicable a plurality of drive controls 3 are required to apply the steering force.

From the combinations of features disclosed above, where necessary isolated features may also be singled out and, with a structural and/or functional relationship which may exist between the features being broken up, be used in combination with other features in order to delimit the subject-matter of the claims. The sequence and/or number of the steps of the methods may be varied. The methods can be combined with each other, for example, to form an overall method.

LIST OF REFERENCE NUMERALS

1 Steering gear mechanism
2 Drive unit
3 Drive control
4 Steering column connection
5 Track rod end
20 Adjustment apparatus
21 Rotor shaft
22 Motor flange
23 Drive gear
24 Carrier
25 First portion of the gear train
26 Recess
27 Intermediate gear
28 Second portion of the gear train
29 Spindle
30 Output gear
31 Spindle nut
32 Rotation/translation gear mechanism
101 Rotation axis of drive gear
102 Rotation axis of cam
103 Rotation axis of intermediate gear
104 Rotation axis of output gear
105 Straight adjustment line
106 Cam

The invention claimed is:

1. An adjustment apparatus for a steering gear mechanism in a motor vehicle, wherein between a drive gear and an intermediate gear there is a first portion of a gear train and between the intermediate gear and an output gear there is a second portion of the gear train, wherein the intermediate gear, in order to adjust a backlash, is movably arranged along a straight adjustment line, wherein a backlash of at least one portion of the gear train can be adjusted, and wherein the straight adjustment line extends through the rotation axis of the output gear and drive gear.

2. The adjustment apparatus for a steering gear mechanism in a motor vehicle as claimed in claim 1, wherein the drive gear, the output gear and the intermediate gear are supported with respect to each other in such a manner that an adjustment of the backlash on one of the portions of the gear train brings about a simultaneous adjustment of the backlash on one of the other portions of the gear train.

3. The adjustment apparatus for a steering gear mechanism in a motor vehicle as claimed in claim 1, wherein one of the drive gear and the output gear is supported so as to be able to be displaced in rotation and translation.

4. The adjustment apparatus for a steering gear mechanism in a motor vehicle as claimed in claim 3, wherein the respective other of the output gear and the drive gear is supported in a fixed manner with respect to a steering gear mechanism housing.

5. A steering gear mechanism for a motor vehicle having an adjustment apparatus as claimed in claim 4, wherein an entire support shaft of the one of the drive gear and the output gear is able to be displaced in rotation and translation.

6. The adjustment apparatus for a steering gear mechanism in a motor vehicle as claimed in claim 1, wherein the intermediate gear is supported so as to be able to slide along the straight adjustment line.

7. The adjustment apparatus for a steering gear mechanism in a motor vehicle as claimed in claim 1, wherein the intermediate gear is supported in a recess which extends along the straight adjustment line.

8. A steering gear mechanism for a motor vehicle having an adjustment apparatus, as claimed in claim 1, wherein the steering gear mechanism has a support device having at least one drive unit and a drive control.

9. The steering gear mechanism for a motor vehicle having an adjustment apparatus as claimed in claim 8, wherein the drive unit is supported so as to be able to be displaced in rotation and translation with respect to the steering gear housing.

10. The steering gear mechanism for a motor vehicle as claimed in claim 8, wherein the straight adjustment line extends through the rotation axis of the output gear and drive gear.

11. A steering gear mechanism for a motor vehicle having an adjustment apparatus as claimed in claim 1, wherein a housing portion and a carrier support the intermediate gear for rotation, the intermediate gear being movable along the straight adjustment line relative to the housing portion and the carrier.

12. A steering gear mechanism for a motor vehicle having an adjustment apparatus as claimed in claim 1, wherein a housing portion and a carrier support the intermediate gear for movement along the straight adjustment line relative to the housing portion and the carrier.

13. A steering gear mechanism for a motor vehicle having an adjustment apparatus as claimed in claim 1, wherein the straight adjustment line extends through the drive gear and the output gear.

14. An adjustment apparatus for adjusting backlash between the gears of a steering gear mechanism for steering force support in a motor vehicle, comprising:
a carrier,
a drive gear which is connected to a drive unit,
an output gear which drives a rotation/translation gear mechanism and a rotation axis of the drive gear is arranged in a fixed manner with respect to the carrier, and
an intermediate gear which connects the drive gear to the output gear, wherein the intermediate gear is arranged so as to be able to be displaced in translation along a straight adjustment line, and wherein the straight adjustment line extends through the rotation axis of the output gear and drive gear.

15. The adjustment apparatus as claimed in claim 14, wherein between a drive gear and an intermediate gear there is a first portion of a gear train and between the intermediate gear and an output gear there is a second portion of the gear train.

* * * * *